United States Patent [19]
Mun

[11] Patent Number: 5,929,410
[45] Date of Patent: Jul. 27, 1999

[54] TERMINAL STRUCTURE FOR VACUUM CIRCUIT BREAKER

[75] Inventor: Ki Rim Mun, Cheongju, Rep. of Korea

[73] Assignee: LG Industrial Systems Co., Ltd., Seoul, Rep. of Korea

[21] Appl. No.: 09/013,165

[22] Filed: Jan. 26, 1998

[51] Int. Cl.$^6$ .............................. H01H 1/46; H01H 1/62; H01H 9/00; H01H 33/66; H02B 1/00
[52] U.S. Cl. ...................... 218/121; 200/50.27; 200/289; 200/258; 218/123; 361/676
[58] Field of Search .............................. 200/50.22–50.27, 200/258–261, 289, 287; 361/676–678; 218/118–120, 121–140

[56] References Cited

U.S. PATENT DOCUMENTS

| | | | |
|---|---|---|---|
| 2,824,939 | 2/1958 | Claybourn et al. | 200/289 |
| 3,127,492 | 3/1964 | Date | 200/258 |
| 3,973,096 | 8/1976 | Burgoon | 200/289 X |
| 4,546,221 | 10/1985 | Lehmann et al. | 200/258 |
| 5,486,662 | 1/1996 | Takishi | 218/118 X |
| 5,770,827 | 6/1998 | Maki | 218/22 |

Primary Examiner—J. R. Scott
Attorney, Agent, or Firm—Birch, Stewart. Kolasch & Birch, LLP

[57] ABSTRACT

A terminal structure of a vacuum circuit breaker is capable of effectively radiating heat when conducting electricity. The terminal structure includes a flat terminal connected with the switching mechanism; a cylindrical terminal having one end welded to the flat terminal, a plurality of radiation fins are formed on an outer circumferential surface thereof, a through hole is formed through a center axis thereof, a plurality of screw fastening grooves are provided on a front surface thereof, and each air vent is formed on one portion and the other portion of the outer circumferential surface thereof; a fastening plate is connected with the front surface of the cylindrical terminal by a plurality of screws, and formed with a hole in a center portion thereof, a plurality of screw fastening holes corresponding to the screw fastening grooves of the cylindrical terminals, and a plurality of insertion grooves along an outer circumferential surface thereof; a plurality of contactors are respectively inserted in the corresponding insertion grooves of the fastening plate, and are formed with a plurality of ring spring fixing grooves on an upper surface of each end thereof; and a ring spring, placed on a corresponding one of the ring spring fixing grooves of the contactors, for fixing each contactor to the cylindrical terminal.

10 Claims, 7 Drawing Sheets

TERMINAL STRUCTURE FOR VACUUM CIRCUIT BREAKER

BACKGROUND OF THE INVENTION

1. Field of the Invention

The present invention relates to a vacuum circuit breaker, and in particular to an improved terminal structure for a vacuum circuit breaker capable of lengthening the life of a terminal. In addition, the present invention relates to improving transfer of heat by effectively radiating heat generated in a terminal away from the terminal when electrifying the vacuum circuit breaker.

2. Description of the Conventional Art

Generally, a vacuum circuit breaker connects or interrupts current between a power source and a load of high voltage and current, for example, over thousands of voltages and of hundreds amperes. A circuit breaker also includes a switching mechanism in a vacuum chamber in order to effectively shield an arc produced when switching the vacuum circuit breaker.

As shown in FIGS. 1 and 2, a conventional vacuum circuit breaker is generally provided with a switching mechanism 10, a switching actuator 20 for operating the switching mechanism 10, and other subsidiary apparatuses (not shown).

The above described elements will now be described with reference to the accompanying drawings.

First, the switching mechanism 10, electrically connecting or interrupting between a power source and a load, is disposed in a vacuum chamber 11.

A movable contactor (not shown) in the vacuum chamber 11 is engaged with the switching actuator 20 of the vacuum circuit breaker. Therefore, when the vacuum circuit breaker is on, the movable contactor is in contact with a fixed contactor (not shown) in the vacuum chamber 11. When the vacuum circuit breaker is off, the movable contactor is separated from the fixed contactor by a predetermined distance.

The switching actuator 20 is disposed at a front side of the vacuum circuit breaker. The switching actuator is a mechanism for actuating an on/off switching operation of the movable contactor.

The subsidiary apparatuses which assist the vacuum circuit breaker to operate normally are provided with a control apparatus (not shown), constructed with the switching actuator 20. The control apparatus receives an external electrical signal and indicates an on/off state of the vacuum circuit breaker as the electrical signal. In addition, the subsidiary apparatuses include a leading apparatus 30 for enabling a terminal of the vacuum circuit breaker to be connected with or separated from a power source terminal or a load terminal, and an interlock (not shown) for securing the leading apparatus 30.

In addition, 40a is a source terminal, 40b is a load terminal, 50a is a source terminal bushing, and 50b is a load terminal bushing. Current from a substation is transmitted to power consumers by passing through the source terminal bushing 50a and the source terminal 40a, the load terminal 40b and the load terminal bushing 50b, via the switching mechanism 10. A safety shutter 51 closes and opens the source terminal bushing and load terminal bushing 50a, 50b. A cradle 52 guides a wheel 12 of the vacuum circuit breaker.

The source terminal 40a which is connected with the switching mechanism 10 and connected with or separated from the source terminal bushing 50a, will now be described with reference to FIGS. 3 to 6.

As shown therein, a flat terminal 42 connected with the switching mechanism 10 is welded to an one end of a cylindrical terminal 41. On a front surface of the cylindrical terminal 41, a plurality of screw fastening grooves 41a are provided.

There is provided a fastening plate 44 in which a plurality of screw fastening holes 44b are formed so as to be connected to the front surface of the cylindrical terminal 41.

A plurality of insertion grooves 44a for inserting a plurality of contactors 43 are disposed along an outer circumferential surface of the fastening plate 44. At least one fastening plate 44 may be provided.

Each of the contactors 43 is formed with a plurality of fixing grooves 43a on upper surfaces of each end thereof for respectively fixing a plurality of ring springs 45 therein. The contactors 43 are also formed with an insertion groove 43b at one side of a lower surface thereof so as to cooperate with one of the insertion grooves 44a, respectively.

A connecting process of the conventional terminal 40 will now be described.

First, the flat terminal 42 is welded to the one end of the cylindrical terminal 44. The fastening holes 44b of the fastening plate 44 respectively correspond with the fastening grooves 41a formed on the front surface of the cylindrical terminal 41. The fastening plate 44 is fastened with a screw 46 to the cylindrical terminal 41.

Each of the contactors 43 is inserted into a corresponding one of the insertion grooves 44a of the fastening plate 44 engaged with the cylindrical terminal 41.

When the ring springs 45 are respectively fitted in one end of the fixing grooves 43a formed on the upper surfaces of both ends of each contactor 43, each contactor 43 is firmly fixed due to elastic forces of the ring springs 45 which work inwardly. The ring springs 45 are then fitted in the other end of the contactors 43 to complete the process.

When the conventional terminal is electrically connected to the source or load terminal bushing, the heat generated in the terminal may not be effectively radiated.

SUMMARY OF THE INVENTION

Accordingly, it is an object of the present invention to provide a terminal of a vacuum circuit breaker capable of improving the performance and lengthening the life thereof by providing a through hole in a cylindrical terminal thereof and effectively radiating heat generated in the terminal when electrifying the vacuum circuit breaker.

To achieve the above objects, there is provided a terminal of a vacuum circuit breaker provided with a switching mechanism which includes: a flat terminal connected with the switching mechanism; a cylindrical terminal in which one end is welded to the flat terminal, a plurality of radiation fins are formed on an outer circumferential surface thereof, a venting hole is formed on the outer circumferential surface thereof, a plurality of screw fastening grooves are provided on a front surface thereof, and each air vent is formed on one portion and the other portion of the outer circumferential surface thereof; a fastening plate connected with the front surface of the cylindrical terminal by screws, and forming a hole in a center portion thereof, a plurality of screw fastening holes, and a plurality of insertion grooves along an outer circumferential surface thereof; a plurality of contactors which are respectively inserted in the corresponding insertion grooves of the fastening plate, and respectively form a plurality of ring spring fixing grooves on an upper surface of each end thereof; and a ring spring, fittedly disposed on a corresponding one of the ring spring fixing grooves of the contactors, for fixing each contactor to the cylindrical terminal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

With reference to the accompanying drawings, a terminal structure of a vacuum circuit breaker will be described.

Figure 7:
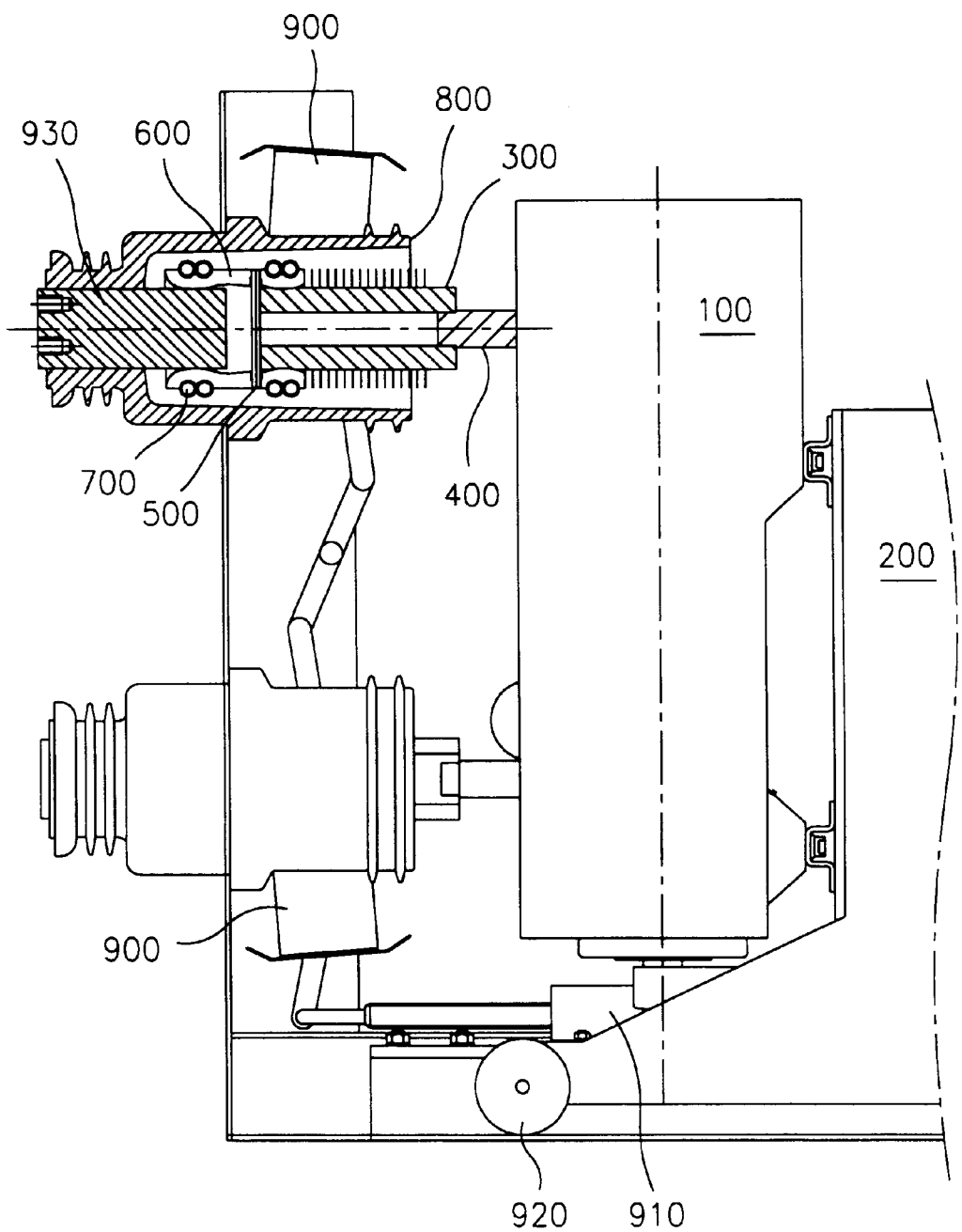
FIG. 7 is a partial cross-sectional view illustrating a vacuum circuit breaker provided with a terminal structure according to the present invention.
Figure 8:
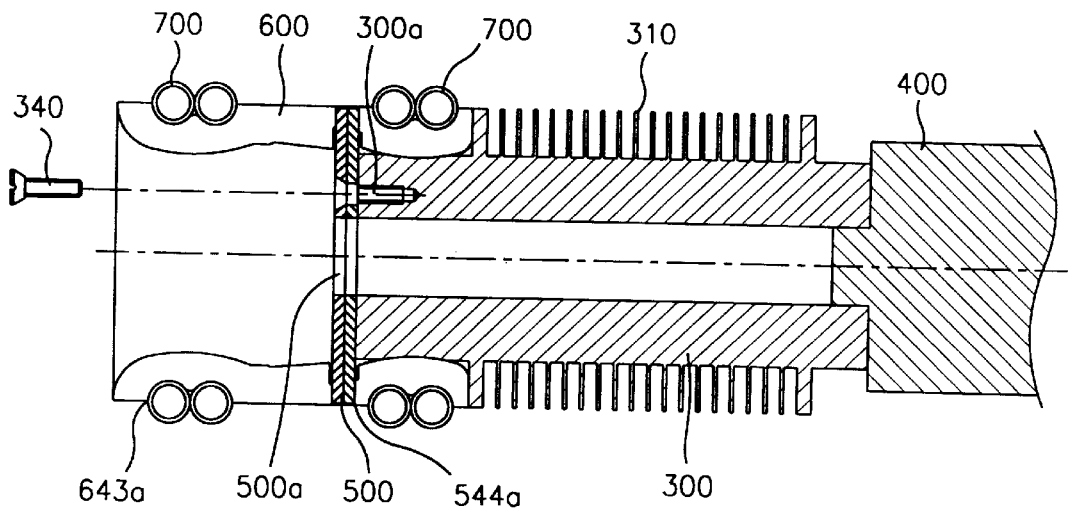
FIG. 8 is a horizontal cross-sectional view of the terminal structure according to the present invention.
Figure 9:
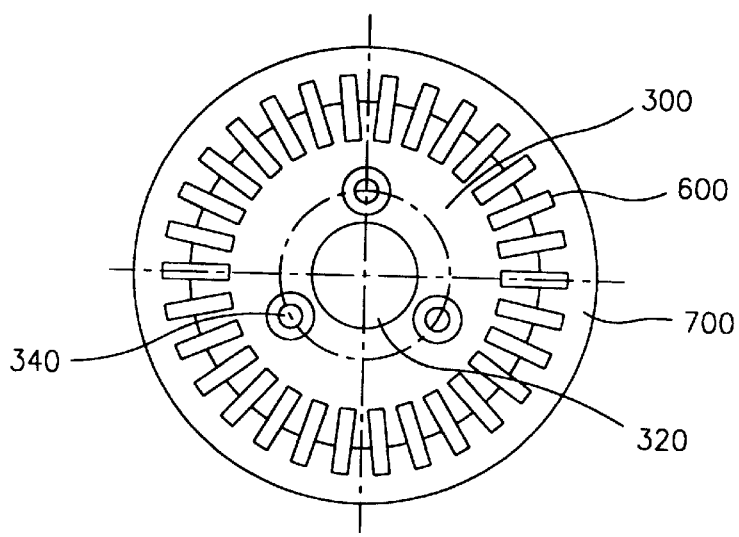
FIG. 9 is a front view illustrating the terminal structure according to the present invention.

As shown in FIGS. 7 to 9, a flat terminal 400 connected with a switching mechanism 100 is welded to one end of a cylindrical terminal 300. The other end of the cylindrical terminal 300 is connected with a fastening plate 500 by a plurality of screws 340. At least one fastening plate 500 can be provided.

Figure 1:
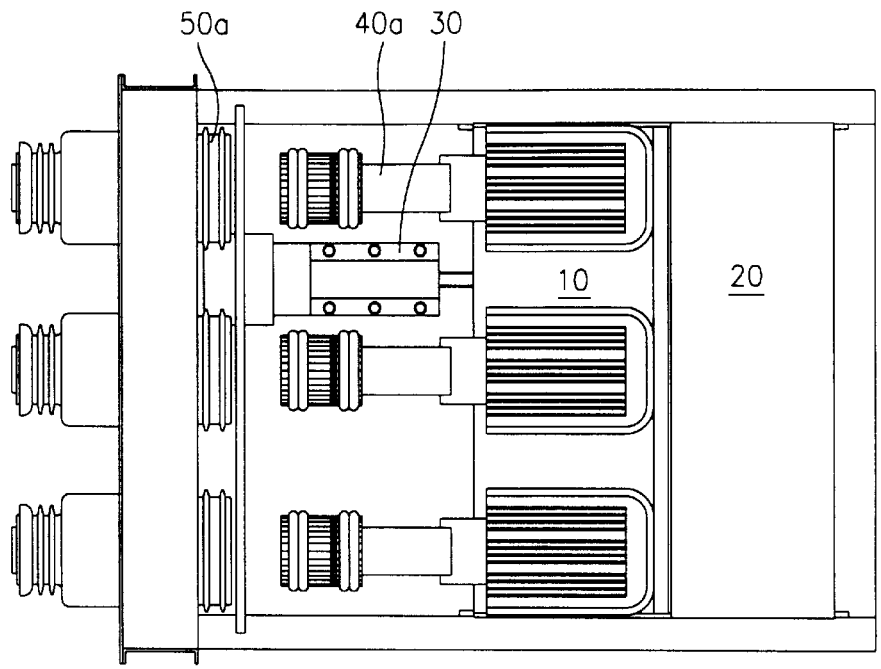
FIG. 1 is a diagram illustrating a vacuum circuit breaker having a conventional terminal structure.
Figure 2:
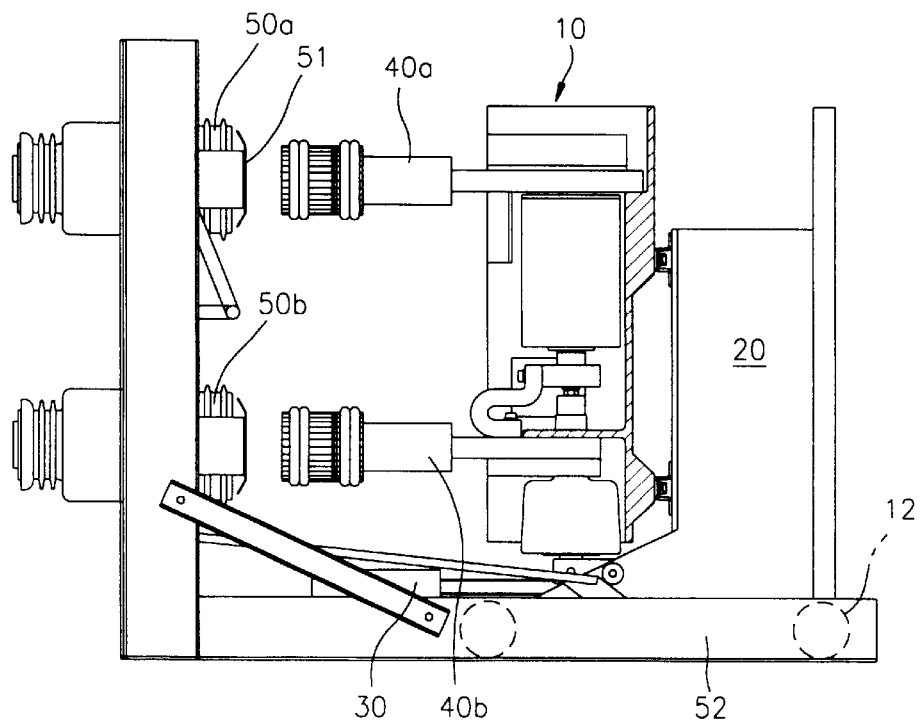
FIG. 2 is a side view illustrating the vacuum circuit breaker having the conventional terminal structure.
Figure 3:
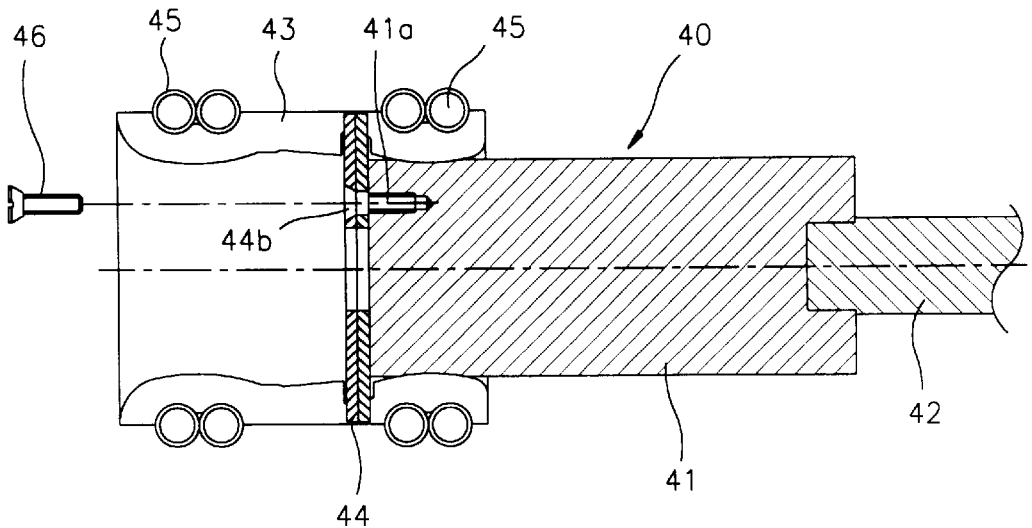
FIG. 3 is a cross-sectional view of the vacuum circuit breaker having the conventional terminal structure.
Figure 4:
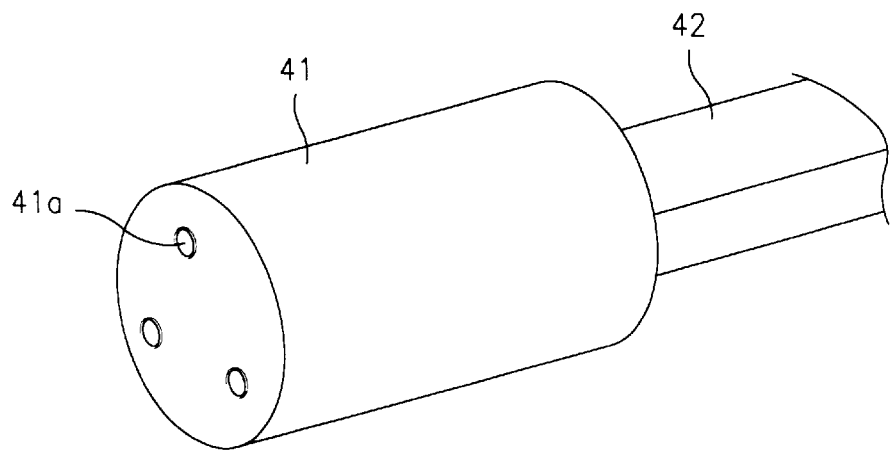
FIG. 4 is a diagram illustrating the conventional terminal in FIG. 3.
Figure 5:
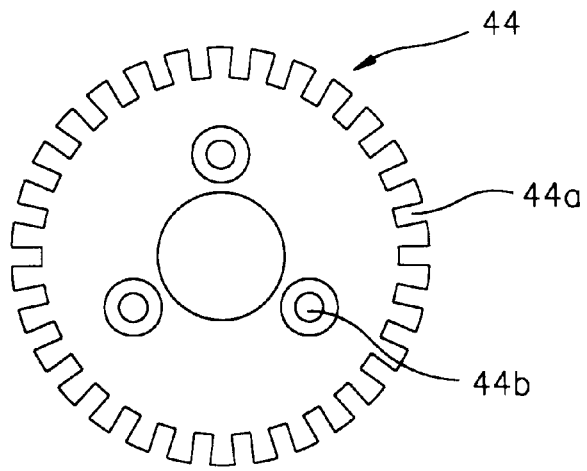
FIG. 5 is a front view illustrating the fastening plate in FIG. 3.
Figure 6:
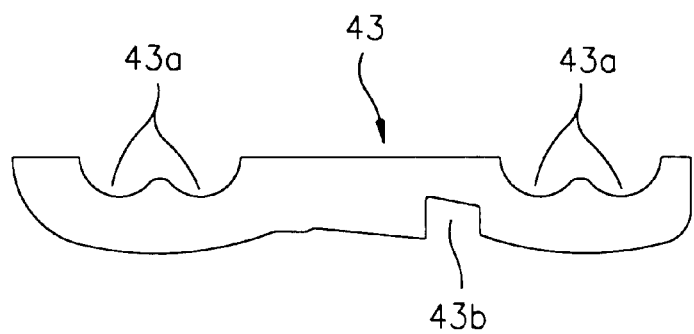
FIG. 6 is a side view illustrating the contactor in FIG. 3.

The fastening plate 500 is shaped as same as the conventional fastening plate 44 as shown in FIG. 5. A plurality of insertion grooves 544a which are formed along an outer circumferential surface of the fastening plate 500, also have the same shape as the conventional insertion grooves 44a as shown in FIG. 5. A plurality of contactors 600, which are shaped as same as the conventional contactors 43 as shown in FIG. 6, are correspondingly inserted into the insertion grooves.

Additionally, a through hole 500a is formed in a center portion of the fastening plate 500.

On an upper surface of each side end of each contactor 600, a plurality of ring spring fixing grooves 643a are respectively formed and a ring spring 700 is placed on a corresponding one of the ring spring fixing groove.

Figure 10:
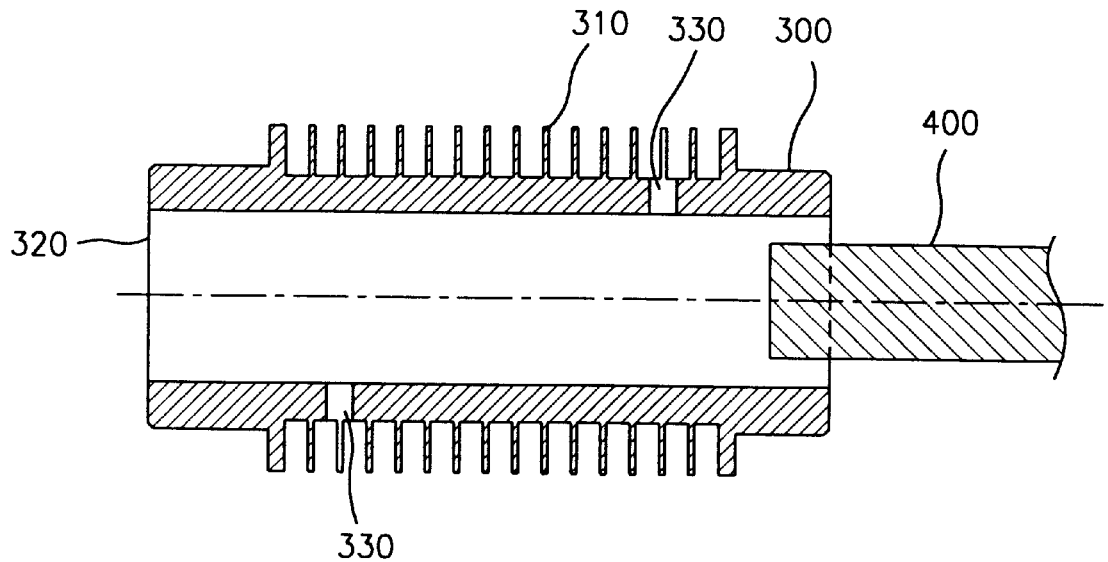
FIG. 10 is a vertical cross-sectional view of the terminal structure in FIG. 8.
Figure 11:
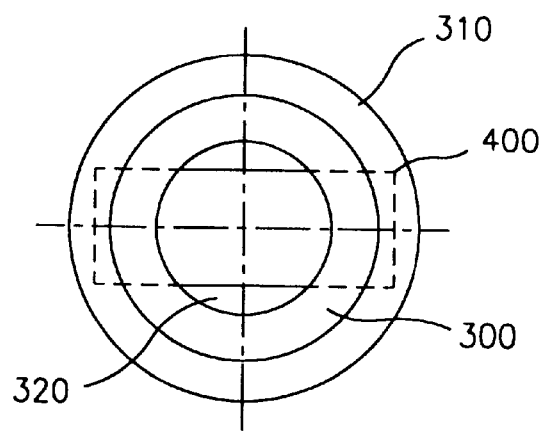
FIG. 11 is a front view illustrating the cylindrical terminal in FIG. 8.

With reference to additional FIGS. 10 and 11, the cylindrical terminal 300 of the terminal structure will be illustrated in detail.

The cylindrical terminal 300 forms a plurality of radiation fins 310 on an outer circumferential surface thereof, and a through hole 320 along a center axis thereof.

In addition, an air vent 330 is provided at one side of the outer circumferential surface of the cylindrical terminal 300, and the other air vent (not shown) is provided at the other side of to the outer circumferential surface.

Figure 12:
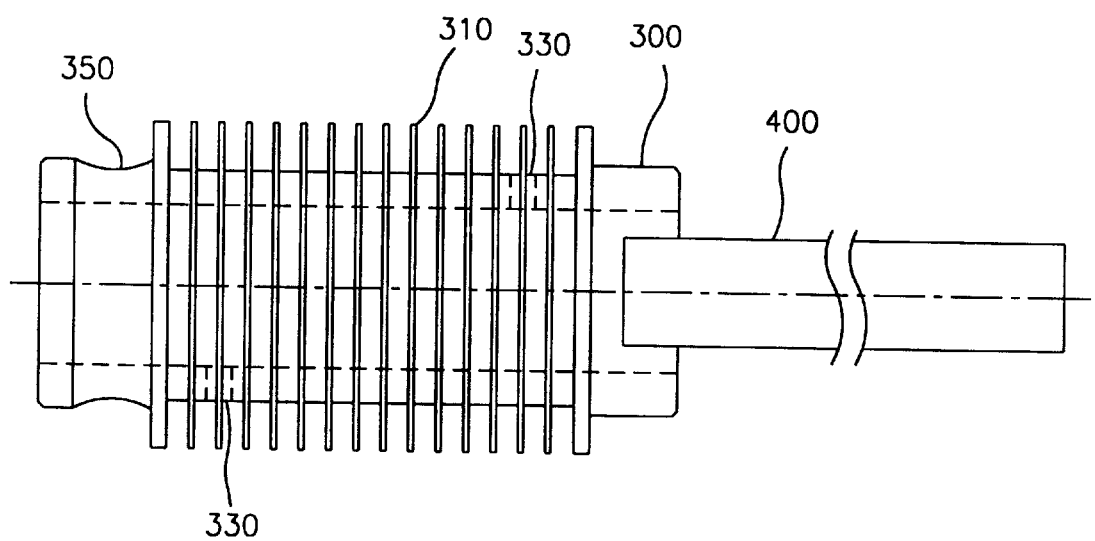
FIG. 12 is a side view illustrating the terminal structure according to an embodiment of the present invention.

As shown in FIG. 12, in the cylindrical terminal 300 according to another embodiment of the present invention, an area which is in contact with each contactor 600 is extended by forming a curvature portion 350 at an outer circumferential surface of a front end portion thereof.

800, 900, 910, and 920, the reference numerals which have not been described, are a bushing, a safety shutter, a lead-out prevention unit, and a wheel of the vacuum circuit breaker, respectively.

A connecting process of the terminal structure of the vacuum circuit breaker according to the present invention will now be described.

First, the flat terminal 400 is connected to the cylindrical terminal 300 by being welded thereto.

A plurality of screw fastening grooves 300a formed in the cylindrical terminal 300 are aligned and fastened with a plurality of screw fastening holes 500b of the fastening plate 500 by the screws 340.

Each of the contactors 600 is inserted in a corresponding one of the insertion grooves formed along the outer circumferential surface of the fastening plate 500.

When the ring springs 700 are fittedly placed on corresponding ring spring fixing grooves formed on the upper surface of one end of each contactor 600 which is contacted with the cylindrical terminal 300, the contactors 600 are firmly fixed due to elastic forces of the ring springs 700. Other ring springs 700 are then placed on corresponding ring spring fixing grooves formed on the upper surface of the other end of each contactor 600, thus completing the connecting process of the terminal structure.

Accordingly, a terminal 930 fixed in the bushing 800 is inserted in the contactors 600. The contactors 600 are inserted in each of the insertion grooves formed along the outer circumferential surface of the fastening plate 500 which is fastened with the cylindrical terminal 300. Thus, electricity can be conducted therethrough. When electricity is being conducted, heat is generated in the cylindrical terminal 300. The produced heat can be effectively radiated through the radiation fins 310, through hole 320, and air vents 330 of the cylindrical terminal 300.

Additionally, the increase of the contact area between each contactor 600 and the cylindrical terminal 300 reduces contact resistance and heat generation.

As described above, the terminal of the vacuum circuit breaker according to the present invention, provided with the through hole, air vents, and radiation fins, is capable of effectively radiating the heat generated when the vacuum circuit breaker is conducted with the electricity.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. In a vacuum circuit breaker, wherein a switching mechanism for connecting/interrupting between a power source and a load is disposed in a vacuum chamber, a terminal structure of the vacuum circuit breaker, comprising:

a flat terminal connected with the switching mechanism;

a cylindrical terminal having one end connected to the flat terminal, the cylindrical terminal including:
  a plurality of radiation fins formed on an outer circumferential surface of the cylindrical terminal;
  a through hole formed through a center axis of the cylindrical terminal;
  a plurality of screw fastening grooves provided on a front surface of the cylindrical terminal; and
  at least one air vent formed on the outer circumferential surface of the cylindrical terminal;

a fastening plate connected with the front surface of the cylindrical terminal by a plurality of screws, the fastening plate including:
  a hole formed in a center portion of the fastening plate;
  a plurality of screw fastening holes respectively corresponding to the screw fastening grooves of the cylindrical terminal; and
  a plurality of insertion grooves formed along an outer circumferential surface of the fastening plate;

a plurality of contactors respectively inserted in the corresponding insertion grooves of the fastening plate, each of the plurality of contactors having first and second ends and including a plurality of ring spring fixing grooves formed on an upper surface of each of the first and second ends; and a ring spring, placed on a respective one of the ring spring fixing grooves of the contactors, for fixing each contactor to the cylindrical terminal.

2. The vacuum circuit breaker of claim 1, wherein the outer circumferential surface of a front end portion of the cylindrical terminal in contact with each contactor is formed with a groove for receiving a contact portion of each of the plurality of contactors.

3. The vacuum circuit breaker of claim 1, wherein the cylindrical terminal is welded to the flat terminal.

4. The vacuum circuit breaker of claim 1, wherein there are two of said at least one air vent, said two air vents are formed on opposite sides of and opposite ends of the cylindrical terminal.

5. The vacuum circuit breaker of claim 1, wherein the at least one air vent is in communication with the through hole in the cylindrical terminal.

6. A terminal structure for a vacuum circuit breaker comprising:

a flat terminal;

a cylindrical terminal having one end connected to the flat terminal, the cylindrical terminal including:
  a plurality of radiation fins formed on an outer circumferential surface of the cylindrical terminal;
  a through hole formed through a center axis of the cylindrical terminal;
  a plurality of screw fastening grooves provided on a front surface of the cylindrical terminal; and
  at least one air vent formed on the outer circumferential surface of the cylindrical terminal;

a fastening plate connected with the front surface of the cylindrical terminal by a plurality of screws, the fastening plate including:
  a hole formed in a center portion of the fastening plate;
  a plurality of screw fastening holes respectively corresponding to the screw fastening grooves of the cylindrical terminal; and
  a plurality of insertion grooves formed along an outer circumferential surface of the fastening plate;

a plurality of contactors respectively inserted in the corresponding insertion grooves of the fastening plate, each of the plurality of contactors having first and second ends and including a plurality of ring spring fixing grooves formed on an upper surface of each of the first and second ends; and a ring spring, placed on a respective one of the ring spring fixing grooves of the contactors, for fixing each contactor to the cylindrical terminal.

7. The terminal structure of claim 6, wherein the outer circumferential surface of a front end portion of the cylindrical terminal in contact with each contactor is formed with a groove for receiving a contact portion of each of the plurality of contactors.

8. The terminal structure of claim 6, wherein the cylindrical terminal is welded to the flat terminal.

9. The terminal structure of claim 6, wherein there are two of said at least one air vent, said two air vents are formed on opposite sides and opposite ends of the cylindrical terminal.

10. The terminal structure of claim 6, wherein the at least one air vent is in communication with the through hole in the cylindrical terminal.

* * * * *